Patented Jan. 10, 1928. 1,655,435

UNITED STATES PATENT OFFICE.

EDWIN F. PIKE, OF CHESTER, AND HENRY F. SMYTH, OF WAYNE, PENNSYLVANIA, ASSIGNORS, BY MESNE ASSIGNMENTS, TO COMMERCIAL SOLVENTS CORPORATION, A CORPORATION OF MARYLAND.

PROCESS OF PRODUCING ACETONE AND BUTYL ALCOHOL BY FERMENTATION.

No Drawing. Application filed May 29, 1923. Serial No. 642,321.

Our invention relates to a process of producing acetone and butyl alcohol by fermentation of molasses, more particularly low grade molasses commercially known as "blackstrap".

In the performance of the process, the acetone and butyl alcohol are produced through fermentation, under aerobic or anaerobic conditions as may be preferred, induced by the action of a certain bacillus *Clostridium butyricum*, the acetone and butyl alcohol, after the process of fermentation is complete, being separated from the fermented mass by suitable distillation as hereinafter described.

The bacteria which we prefer to use and which have been isolated in the manner hereinafter stated, we will now proceed to describe in accordance with the descriptive chart of the Society of American Bacteriologists in order to facilitate their identification:

Source—corn mash; name—*Clostridium butyricum* (Prazmowski-Pike-Smyth).

Rods .75–1×3–10 microns, occurring singly, in pairs and long chains. Actively motile in young cultures. Spores oval, central to excentric 1×2–2.5 microns. Cells store glycogen as granules, polar or excentric along rod margin. Gram-positive in young cultures but early become gram-negative. May have slender forms .5 microns in width and filaments up to 20 microns in length.

Gelatin stab: no liquefaction.

Serum agar colonies: (anaerobic) small, flat, irregular, grayish, semitransparent.

Agar and dextrose agar slants: (anaerobic) grayish, flat, moist, spreading, with irregular lacerate margin. No surface growth aerobically.

Dextrose broth: turbid.

Litmus milk: acid, coagulation, abundant gas formation with firm contraction of torn curd.

Early reduction of litmus.

Potato: (anaerobic) thin, spreading, barely visible, yellowish-white layer, forming later raised points. Substance of potato slant, becoming soft and friable with gas bubbles.

Acid gas and alcohols formed in dextrose, lactose, sucrose and starch. Acid principally butyric.

Gas formed consists of $CO_2$ and $H_2$.

Optimum temperature range 30–40° C.

Colonies in agar shake cultures, compact, irregular nucleus .25–.5 mm. surrounded by a flocose haze 2–3 mm. in diameter.

Anaerobic agar stab, granular filiform growth.

Nitrates reduced to nitrites and ammonia in anaerobic culture.

No indol formation.

*Isolation of the organism.*

The bacillus was originally derived from corn meal by the method of Weizmann, being obtained in predominating culture in test tubes. Thereafter, the bacillus was secured in practically pure culture by several successive sub-cultures in deep dextrose agar tubes, the material for the sub-cultures being fished from the bottom of such tubes after cutting them open with a file and the sub-culture tubes being heated to 100° C. for two minutes before incubation. After the pure culture was obtained, the bacillus has been retained in 5%–10% corn meal mash.

For a specific example of the operation of our invention for the fermentation of molasses, such as blackstrap, to produce acetone and butyl alcohol, a mash was prepared consisting of black strap diluted with water so as to contain substantially 5% of molasses, and was then sterilized in a suitable sterilizer by heating under approximately 15 pounds steam pressure for substantially 30 minutes. The sterilized mixture was then placed in a sterilized container and inoculated with the culture of the bacillus. Preliminary to inoculation, a sealed spore tube containing the bacillus was opened, emptied into a flask of sterile 5% corn meal, in water, and the mixture incubated at 38–42° C. for from 48 to 72 hours. The contents of this flask were then poured into the mash, about one part of the seeding culture to 30–35 parts of the mash being employed. Fermentation was then allowed to proceed for substantially 4 days under temperatures of from 39° to 41° C., at the expiration of which period frothing ceased and analysis of a sample of the fermented mass disclosed the presence of acetone. The mass was then steam distilled in a suitable still until the distillate no longer smelled of acetone or butyl alcohol. Thereafter the distillate was distilled and a fraction taken between 90° and 120° C. On standing, this fraction separated into two layers which were then separately distilled and the acetone and butyl alcohol collected from them at their respective boiling temperatures.

It is to be noted that satisfactory results in the treatment of the black strap were not obtained when the inoculated mass was contained in copper receptacles, but that the fermentation proceeded satisfactorily when the mass was contained in glass or porcelain lined receptacles, and it is therefore believed that in the commercial practice of the process the receptacles employed should be lined with glass, porcelain or some other vitreous or substantially similar material.

We have further found that the addition of nitrogeneous material to the mash or mixture is ordinarily unnecessary for the attainment of satisfactory results, the black strap molasses containing sufficient quantities of such material to permit proper growth of the bacilli, and the same is equally true when other carbohydrates containing suitable quantities of nitrogeneous material are being treated. Should, however, the particular material forming the base of the fermentable mixture be deficient in nitrogeneous material, a suitable amount thereof may be added to assist in the proper development of the bacilli.

Moreover, while if desired, the fermentation may be carried out under anaerobic conditions, it is unnecessary for successful operation to exclude air from access to the fermenting mass and the fermentation may therefore, and preferably, be performed under aerobic conditions. It is, however, desirable to prevent access to the fermenting mass of organisms which might be inimical to the fermentation or which might in other ways be detrimental, and we therefore take suitable and usual precautions to exclude such organisms as far as possible and thereby prevent the danger of resulting contamination. Thus, when the mass is subjected to fermentation in one receptacle and to distillation in another, the fermenting tank may be closed with a loosely fitting cover or with a tightly fitting cover provided with means to permit the escape of the $CO_2$, $H_2$ and other products of fermentation, or when the same apparatus is used to hold the mash during the fermentation period and also during the initial distilling operation, the same may be provided with a steam tight cover from which a vent pipe may be extended upwardly and bent over and downwardly adjacent its extremity so as to provide a long and tortuous passage, thereby very largely preventing the entrance of bacteria to the receptacle but still allowing the escape of the products of fermentation.

It will be understood that after the initial, preferably steam, distillation, the distillate so obtained is again distilled in any suitable still and preferably fractionated as described in the preceding examples, the fraction so obtained separating into distinct layers which, on separate distillation, yield acetone and butyl alcohol at their respective boiling temperatures. The products so obtained may be of course be re-distilled as many times as desired to obtain the required purity, such subsequent re-distillations being performed in any suitable apparatus as will be readily understood by those familiar with the act.

We are aware that it has been proposed to produce acetone and butyl alcohol by the fermentation of amylaceous carbohydrates by means of an aerobic organism and that various efforts have been made in the past to adapt such organisms to the fermentation of saccharine carbohydrates, but we believe it broadly new to produce acetone and butyl alcohol by the fermentation of molasses in the absence of amylaceous materials, and we ascribe the success of our improved process and invention to the distinctive character of the herein described organism which produces acetone and butyl alcohol with satisfactory yields in the absence of amylaceous materials.

While we have herein, for the purpose of enabling those skilled in the art to comprehend and practise the invention, described with considerable particularity certain preferred methods of performing the same, we do not thereby desire or intend to specifically limit ourselves thereto, as various changes and modifications may be made for the purpose of facilitating the practice of the invention or for such other purposes as may be desirable without departing from the spirit and scope of the invention as defined in the appended claims.

Having thus described our invention, we claim and desire to protect by Letters Patent of the United States:

1. The process of producing acetone and butyl alcohol by fermentation of molasses which comprises adding a culture of *Clostridium butyricum* (Prazmowski-Pike-Smyth) in the absence of amylaceous materials to a sterilized mash of molasses and water, and then allowing fermentation to proceed to completion.

2. The process of producing acetone and butyl alcohol by fermentation of molasses which comprises adding a culture of *Clostridium butyricum* (Prazmowski-Pike-Smyth) in the absence of amylaceous materials to a sterilized mash of molasses and water, and then maintaining the temperature of the inoculated mash at 39°–41° C. until fermentation is complete.

3. The process of producing acetone and butyl alcohol by fermentation of molasses which comprises adding a culture of *Clostridium butyricum* (Prazmowski-Pike-Smyth) in the absence of amylaceous materials to a sterilized aqueous mash containing substantially 5% of molasses, and then maintaining the temperature of the inoculated mash at 39°–41° C. until fermentation is complete.

4. The process of producing acetone and butyl alcohol by fermentation of molasses which comprises preparing a sterile mash of molasses and water, inoculating the mash with a culture of *Clostridium butyricum* (Prazmowski-Pike-Smyth) in the absence of amylaceous materials, maintaining the temperature of said inoculated mash at 39°–41° C. until fermentation is complete, and distilling the fermented mass to obtain acetone and butyl alcohol therefrom.

5. The process of producing acetone and butyl alcohol by fermentation of molasses which comprises preparing a sterile mash of molasses and water having a content of substantially 5% of molasses, inoculating the mash with a culture of *Clostridium butyricum* (Prazmowski-Pike-Smyth) in the absence of amylaceous materials, maintaining the temperature of said inoculated mash at 39°–41° C. until fermentation is complete, and distilling the fermented mass to obtain acetone and butyl alcohol therefrom.

In witness whereof, we have hereunto set our hands this 28 day of May, 1923.

EDWIN F. PIKE.
HENRY F. SMYTH.